Oct. 16, 1956  H. G. BAERWALD  2,766,659
DEVICE FOR CONTROLLING LIGHT INTENSITY
Filed Dec. 11, 1950
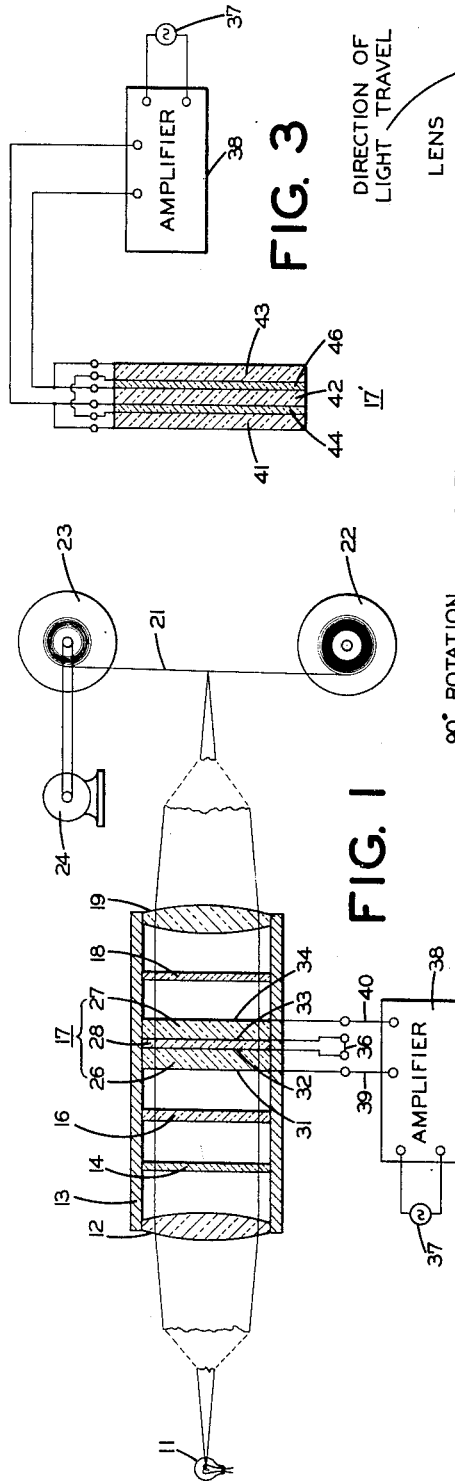
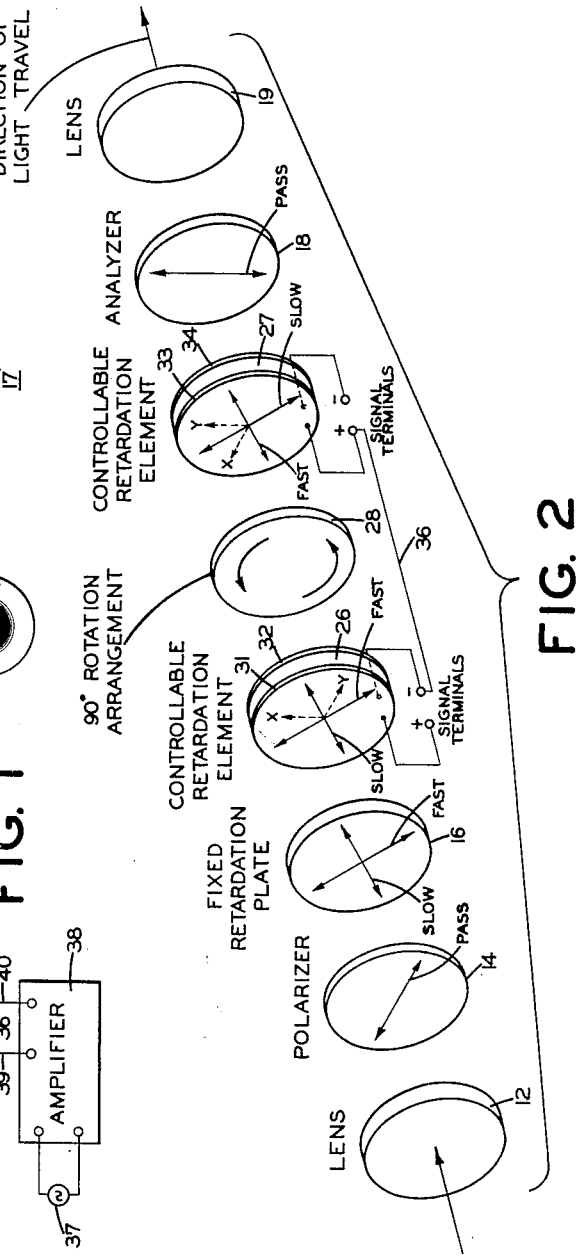
*INVENTOR.*
HANS G. BAERWALD
BY
Harries A. Mumma Jr.
ATTORNEY

United States Patent Office 2,766,659
Patented Oct. 16, 1956

2,766,659

DEVICE FOR CONTROLLING LIGHT INTENSITY

Hans G. Baerwald, Cleveland Heights, Ohio, assignor, by mesne assignments, to Clevite Corporation, Cleveland, Ohio, a corporation of Ohio Application December 11, 1950, Serial No. 200,273

14 Claims. (Cl. 88—61)

This invention relates to devices for controlling light intensity, and more particularly to devices of the type known as electro-optic shutters for controlling the intensity of plane-polarized light directed along the optical path of the shutter device.

It has been proposed for many years to control the intensity of polarized light passing through an electro-optic device utilizing the property of the Kerr cell to modify the polarization of plane-polarized light. Thus a beam of light is passed through a polarizer, then through the liquid in a Kerr cell, and finally through an analyzer arranged to pass light having a plane of polarization at a predetermined angle to the plane of polarization of light passing the polarizer. The magnitude of the electrical signal impressed on the Kerr cell determines the intensity of the light components having a plane of polarization oriented for passage through the analyzer. This arrangement suffers from the disadvantages of low electro-optic sensitivity, a quadratic rather than linear electro-optic response, high voltages, and limited cross section of the optical system.

Various piezoelectric crystals have the property of a substantial linear electro-optic effect. For example, it has been proposed to exploit this property of X-cut quartz crystals, arranged with the light rays traveling in the direction of the crystallographic Z-axis and with the controlling electric field applied transversely to the light rays, parallel to the X-axis. To permit larger apertures for commensurate signal voltages it would be advisable to have the signal field in the direction of light travel. For this purpose it has been proposed to utilize the crystalline substance zinc sulfide, known as zinc blende or sphalerite, placed in an optical system with roughly predetermined crystallographic orientations. However, electro-optic elements of crystalline zinc sulfide are difficult and generally unsatisfactory to make, and lack the high transparency desirable in optical systems. Sodium chlorate crystals also may be used, but their electro-optic sensitivity is low and they have a natural optical activity irrespective of the applied field.

Much improved results can be obtained with single-crystalline plates or elements of the P-type crystal materials. The expression "P-type crystal materials" is intended to mean ammonium dihydrogen phosphate, potassium dihydrogen phosphate, rubidium dihydrogen phosphate, the corresponding dihydrogen arsenates, isomorphous mixtures of any of these named compounds, and all other piezoelectrically active crystal materials isomorphous therewith. The dihydrogen phosphates and arsenates also are known as primary phosphates and arsenates.

In electro-optic apparatus of this type, a P-type crystal in the form of a Z-cut plate is placed in the apparatus with the Z-axis of the crystalline material aligned in the direction of the optical path and with either the diagonal X-axis or Y-axis lying within the plane of polarization of the entrant light. Then the polarized light entering such a crystal plate may be considered to have two equal plane-polarized components at 45° to the plane of polarization of the entrant light. Upon the application of an electric field in the direction of the Z-axis of the material, the crystal lattice structure is modified slightly by the action of the field, with the result that the material becomes reversibly birefringent, that is, the phase velocities of these two components polarized in planes making 45° angles with the directions of the X- and Y-axes become somewhat different. Upon leaving the crystal plate the two components therefore have a relative phase retardation, and the resultant polarized condition of the light in general is called elliptical polarization. Such a crystal plate in the electrically excited condition thus may be used to effect controllable retardations, by which is meant the relative phase retardations suffered by the two mutually perpendicular components of polarized light. Retardation plates for obtaining fixed retardations are common optical elements and are discussed hereinbelow.

If the phase difference or retardation of the two components corresponds to a quarter wavelength of the monochromatic light passing through the system, the light has become circularly polarized, assuming equal attenuation in passage of the "slow" and "fast" components. This condition also occurs for retardations corresponding to odd multiples of quarter wavelengths. If the phase relationship of the slow and fast rays amounts to a relative retardation corresponding to a half wavelength, or an odd multiple thereof, the two plane-polarized rays recombine upon leaving the retardation plate to form a plane-polarized resultant having the plane of polarization rotated 90° from the plane of polarization of the entrant light. Retardations corresponding to one or more full wavelengths give a resultant plane of polarization parallel to the original plane. Retardations which do not correspond to a half or full wavelength or multiples thereof cause the emergent light to have components of polarization in both the original plane of polarization and in the plane at right angles thereto with mutual phase difference, as is characteristic of elliptically polarized light. The extent of the shutter action for a given applied field depends on the amplitude of the plane-polarized component which the analyzer is oriented to pass.

The arrangement for controlling the transmission of polarized light utilizing an electroded plate of a P-type crystal material, oriented crystallographically as described above, is disclosed and claimed in the copending application for Letters Patent of the United States Serial No. 780,022, now Patent No. 2,616,962, filed October 15, 1947, in the name of Hans Jaffe and assigned to the same assignee as the present invention. Similar arrangements employing specifically P-type primary phosphate crystal materials are disclosed and claimed in the copending application for Letters Patent of the United States Serial No. 780,021, now Patent No. 2,591,701, filed October 15, 1947, in the name of Hans Jaffe and assigned to the same assignee as the present invention.

The linear electro-optic effect in crystalline substances includes the so-called "clamped" or "direct" electro-optic effect, which is characterized by a retardation or birefringence proportional to the electrostatic field or dielectric polarization, under the hypothetical condition that the crystal plate is ideally clamped, that is, that strains induced in the crystal are totally suppressed.

However, other phenomena associated with the crystal structure may influence the electro-optic response or otherwise disturb the operation of an optical system intended to utilize this direct effect. One of these phenomena is an additional component of the linear electro-optic effect. This component, which may be called the "indirect" effect, results from the fact that the electrostatic field in the crystal also produces, by virtue of the piezoelectric effect, elastic strains and stresses in the crystal plate, and these elastic effects in turn produce an optical birefringence through the elasto-optical effect. If, as mentioned above, a material such as a P-type crystal material were clamped so as to be rigidly constrained elastically throughout, the indirect electro-optic response would be suppressed completely. Usually, however, it is impractical to obtain adequate clamping, and additional or indirect electro-optic response in general will become pronounced at frequencies in the region of any dimensional elastic resonances of the crystal plate; such effects tend to become less important at resonances of very high order because of damping in conjunction with cancellation due to the phase opposition of the different regions that are separated by nodal surfaces.

In accordance with the principles of crystal physics it may be shown mathematically that the three effects mentioned above, namely, the linear clamped electro-optic effect, the piezoelectric effect, and the elasto-optic effect, which are mutually interactive, are crystallographically isomorphic in the mathematical sense. This signifies that there are one-to-one correspondences between the tensors or coefficient schemes associated with these three effects. It follows that any other effects which exhibit such isomorphism with the linear electro-optic affect also will be encountered to an extent dependent upon the shape, size, and crystallographic structure and orientation of the crystal material used in the electro-optic system. To the extent that such other isomorphic effects modify the direct electro-optic effect or otherwise interfere with the optical operation of the system, these other effects are undesirable in the electro-optic arrangements of the prior art.

Accordingly, it is an object of the present invention to provide a new and improved device for controlling the intensity of plane-polarized light which avoids one or more of the disadvantages of the prior art arrangements.

It is another object of the invention to provide a new and improved device for controlling the intensity of plane-polarized light which substantially eliminates optical effects other than the desired direct electro-optic response to an applied field.

It is a further object of the invention to provide a new and improved device for controlling the intensity of plane-polarized light which is not subject to the signal frequency band width limitations heretofore imposed by the presence of undesired elasto-optic phenomena in prior art devices.

In accordance with the invention, a device for controlling the intensity of plane-polarized light directed along an optical path comprises a plurality of crystalline elements, disposed with predetermined crystallographic orientations along the optical path for passage of the polarized light therethrough successively, each of which is of crystalline material having substantially the same property, when rigidly constrained elastically, of responding to a variable homogeneous electrostatic field therein by exhibiting an optical retardation proportional to the electrostatic field. This device further comprises a plurality of electrode and terminal circuit means for applying electrical energy individually to each of the plurality of crystalline elements to produce an electroelastic field therein, and at least one optical rotation arrangement, disposed along the optical path between successive ones of the plurality of elements, for providing therebetween an effective ninety degree rotation of the plane of any plane-polarized light component passing therethrough along the optical path, all of the terminal means being arranged for interconnection to produce in the elements electrostatic fields of such relative polarities and magnitudes that, with respect to a common frame of reference, the retardation effects developed in those two of the elements preceding and following each optical rotation arrangement are of opposite sign and also the algebraic sum of the retardation effects developed in all the elements is substantially zero.

For a better understanding of the present invention, together with other and further objects thereof, reference is had to the following description taken in connection with the accompanying drawing, and its scope will be pointed out in the appended claims.

Fig. 1 is a sectional view of a device for controlling light intensity which embodies the present invention;

Fig. 2 is a schematic view illustrating the relationships of the several elements of the device shown in Fig. 1; and Fig. 3 is a sectional view of a portion of a modified form of light-controlling device embodying the invention.

Referring now to Fig. 1, a device is shown for controlling the intensity of plane-polarized light directed along an optical path. As will be apparent hereinbelow, the control of the light intensity is effected by an electrical controlling signal. This signal may have a great variety of magnitude and frequency characteristics. For example, the controlling signal may contain a continuous band of frequencies which may extend from D.-C. into the megacycle range, such as are encountered in television and pulse systems.

The device shown in Fig. 1 comprises, in particular a light source 11 of small area and a collimating lens 12 affixed within a cylinder 13 of opaque material, the axis of which coincides with the light path determined by the arrangement of light source and lens. Also affixed within the cylinder 13 in the sequence mentioned are a polarizer 14, a retardation plate 16, a control unit 17, an analyzer 18, and a focusing lens 19. The lens 19 is of the type which focuses parallel light rays passing through the cylinder 13 on a focal surface.

Any of numerous types of focal surfaces may be incorporated in the device of the invention, for example a viewing screen. In the particular device illustrated in Fig. 1, there is provided an image-recording arrangement at the focal surface or focal point in the form of a recording photographic film 21, which is unwound from a reel 22 on to a reel 23 by means of a motor 24 driving the reel 23. Thus the optical path extends from the light source 11 axially through the cylinder 13 to the focal point at the sensitive surface of the film 21. While the drawing illustrates an arrangement for focusing an image of a small light source on the film 21, it will be understood that a similar arrangement may be used as an electro-optic shutter in the projection of detailed images along the optical path for focusing on a focal surface of sizable area on film 21.

The control unit 17 comprises a plurality of crystalline elements, specifically two crystalline elements 26 and 27. At least one optical rotation arrangement, in this case an optical rotation plate 28, is disposed along the optical path between successive ones of the plurality of elements, that is, between the elements 26 and 27. Light-transmitting electrodes are provided on each surface of the elements 26 and 27, although these electrodes are too thin to be distinguished in the view of Fig. 1 from the surfaces of the elements to which they are affixed. These electrodes may be very thin transparent metallic deposits, or they may be of a transparent glassy material having a suitable low resistivity, utilizing materials and techniques known to the art. The electrical signal conveniently is applied to the electrode from a metallic rim encircling the electrode. Such conductive transparent glassy coatings may not have sufficient conductivity to maintain the signal voltage over the entire electroded surface if the signal frequency is high. In such a case a network of thin metallic conductors can be incorporated in the transparent conductive material to carry the electrical energy from the metallic rim to the electroded areas near the center of the element. These metallic conductors, being at out-of-focus regions in the optical system, do not interfere substantially with images projected through the system, and the conductors may be made of appreciable thickness in the direction of light travel to minimize resistance without obstructing the light. As seen in Fig. 2, there are provided a pair of electrodes 31, 32 on the two sides of the element 26 and another pair 33, 34 on the two sides of the element 27. These four electrodes are extended to individual signal terminals. The intervening plate 28 is firmly cemented on both sides of that plate to the respective adjacent electroded surfaces 32 and 33 of the elements 26 and 27 respectively, and the signal terminals of these last mentioned electrodes are interconnected electrically by a conductor 36.

Also shown in Fig. 1 is a signal source 37 which provides an electrical controlling signal having any of the characteristics mentioned hereinabove. The source 37 is coupled to the input circuit of an amplifier 38, which may be a broad band amplifier, the output circuit of which is connected by conductors 39 and 40 to the terminals of the remaining electrodes 31 and 34 of the elements 26 and 27 respectively. Thus the electrodes 31, 32 and 33, 34 and the conductors 36, 39, and 40, in conjunction with the circuits of the amplifier 38, constitute a plurality of electrode and terminal circuit means for applying electrical energy individually to each of the elements 26 and 27 to produce an electrostatic field therein.

During operation of the device shown in Fig. 1 light emitted from the source 11 travels to the collimating lens 12, whence it is directed along the optical path to the lens 19, which focuses it on the moving film 21 to obtain a photographic record of the intensity of the light image passing through the device. By virtue of the control arrangements discussed hereinbelow, the input signal from the source 37, amplified in the amplifier 38 and applied to the control unit 17, causes the light reaching the film to be varied or modulated in accordance with the signal to be recorded.

The several elements of the device shown in Fig. 1 which are disposed between the collimating lens 12 and the focusing lens 19 are illustrated schematically in Fig. 2. The polarizer 14 is oriented to pass substantially only the components of the entrant light which are polarized in one plane, for example a horizontal plane. The intensity of the plane-polarized light leaving the polarizer 14 and directed along the optical path to the film 21 is controlled by the units of the device disposed along the optical path following the polarizer.

The fixed retardation plate 16 is equivalent to a fixed electrical bias voltage, applied to the electro-optic shutter arrangement, of one half the magnitude for complete shutter action. This plate may be omitted if desired. Nevertheless it often is convenient to incorporate a quarter wave retardation plate somewhere between polarizer and analyzer. This has the advantage that, in the absence of a modulating signal, the light-controlling device or shutter is biased to a point midway between maximum and minimum transmission. This improves the linearity of control for modulating signals and decreases by half the control signal amplitude necessary to open or close the shutter completely. The effect of the quarter wave retardation plate, as mentioned above, is to produce circularly polarized light, with the horizontally polarized and vertically polarized components out of phase but of equal magnitudes as they reach the analyzer in the absence of a control signal.

As mentioned hereinabove, fixed retardation plates are available and are used in various types of optical equipment. Such plates consist of crystalline material cut perpendicular to an optic axis. In the Fig. 1 arrangement, the fixed retardation plate may be, for example, a thin plate of mica with the planes of the slow and fast rays oriented at 45° to the horizontal. If the orientation of these planes is interchanged, the only result is a reversal of the polarity of the control action. The thickness of such a plate is equal to the desired retardation, expressed in terms of the wave length of the light in vacuo, divided by the difference of the refractive indices of the two principal components. Quarter wave retardation plates made of such materials as mica or gypsum, frequently used for this purpose, thus turn out to have thicknesses of the order of a tenth of a millimeter. Stretched plastic sheets have come into use recently as retardation plates. The birefringence is due, in this case, to the differences in refractive index in the direction of stretch and perpendicular to it. The birefringence of such sheets is appreciably smaller than in those crystals commonly used as retardation plates.

The control unit 17 itself includes the plates or disks 26 and 27, which are disposed with predetermined crystallographic orientations along the optical path for passage of the polarized light therethrough successively. Each of these elements is of crystalline material having substantially the same property, when rigidly constrained elastically, of responding to a variable homogeneous electrostatic field therein by exhibiting an optical retardation proportional to that electrostatic field. In essence it will be apparent that this requires the material of each of the elements to exhibit to a useful degree the direct electro-optic effect.

X-cut quartz crystals could be used for these electro-optic elements. In such a case the electro-optic response is proportional to both the dimension in the direction of the Z-axis, which is the direction of light travel, and to the transverse electrostatic potential gradient, which is in the direction of the X-axis. Other crystalline materials exhibiting a linear electro-optic response to fields transverse to the direction of light travel may be used for such arrangements, in particular crystals belonging to the same crystallographic as quartz, namely, class 3 2, otherwise designated $D_3$. Crystals in the class $\bar{6}m2$, otherwise designated $D_{3h}$ or $I_{6v}$, would be well suited, inasmuch as the electro-optic effect in such crystals is independent of the direction of a field applied in the plane perpendicular to the Z-axis, in the direction of which light travels, as in the previous case.

However, for reasons mentioned hereinabove, it is recommended that these elements be of material having an electro-optic sensitivity to longitudinal rather than to transverse electrostatic signal fields. For convenience of illustration, the drawing shows electro-optic elements of the latter type.

More specifically, it is preferred that the elements 26 and 27 be cut from single-crystalline material belonging to one of the crystal classes characterized by a four-fold inversion-rotation axis and by planes of symmetry containing that axis. The inversion-rotation axis of each such element is aligned in the direction of the optical path and the other crystallographic axes thereof have predetermined orientations, as exemplified hereinbelow. In general, elements cut from single crystals belonging to the crystallographic class $\bar{4}2m$, otherwise designated $V_d$ or $D_{2d}$, or to the crystallographic class $\bar{4}3m$, otherwise designated $T_d$, satisfy the symmetry requirements just mentioned. Preferably the elements are P-type crystal elements, which belong to the class $V_d$ and are cut from crystals of one of the P-type crystal materials mentioned hereinabove. Elements of ammonium dihydrogen phosphate, of potassium dihydrogen phosphate, or of potassium dihydrogen arsenate are especially preferred.

When a P-type crystal element is included in the control unit, the element should be a Z-cut plate with the crystallographic Z-axis of each such element aligned in the direction of the optical path with predetermined orientations of the X- and Y-axes thereof. Suitable orientations of these axes are illustrated in Fig. 2. The direction of the Z-axes coincides with the direction of light travel along the optical path; the crystal symmetry is such as to make the positive and negative directions of the Z-axes indistinguishable as far as electrostatic, optical, elastic, and most other properties are concerned. The X- and Y-axes of these crystals are chosen conventionally as parallel to the diagonal axes and bisecting the planes of symmetry of the crystal lattice. These X- and Y-axes are disposed horizontally and vertically as seen in Fig. 2, with the result that the slow and fast components of elliptically polarized light passing through the element are at 45° to the horizontally polarized light passing the polarizer 14. As discussed above, this is the condition for the desired retardation phenomena. It is noted that the birifringent properties giving rise to these retardation effects are developed only when electrical energy is applied to the element to produce an electrostatic field in the direction of the inversion-rotation axis thereof, in this case the Z-axis coinciding with the direction of the optical path. Accordingly the pair of electrodes 31, 32 or 33, 34 is arranged in the light path adjacent to the Z-faces of each of the elements 26 and 27, these electrodes being at least partially transparent to the light to permit the light to enter and leave each of the elements.

It may be noted from Fig. 2 that the element 27 is oriented with the planes of the X- and Y-axes interchanged as compared with the element 26. In accordance with the invention, all of the terminal circuit means associated with the electrodes 31—34 and the amplifier 38 are arranged for interconnection to produce in the elements 26 and 28 the aforementioned electrostatic fields of such relative polarities and magnitudes that, with respect to a common frame of reference such as that established by the direction of light travel in Fig. 2 and fixed horizontal and vertical planes parallel thereto, the retardation effects developed in the two elements 26 and 27 preceding and following the rotation plate 28 are of opposite sign and also the algebraic sum of the retardation effects developed in all of the elements is substantially zero. In the case illustrated in Fig. 2 the retardation effects developed in the two elements are of opposite sign because the X- and Y-axes are interchanged, while the electrodes 31—34 are interconnected so that the signal fields in the two elements have the same directions relative to the commone Z-axis of the elements. An alternative way of developing in the two elements retardation effects of opposite sign would be to align the X- and Y-axes, respectively, of the two elements, but to arrange the terminal circuit means for interconnection to produce signal fields in opposite directions in the two elements.

According to the above, the terminal circuit arrangement is such that the voltages applied across the two elements produce retardation effects also of equal magnitudes, whereby the algebraic sum of the two effects with respect to a common, external frame of reference is substantially zero. In the usual case the two elements 26 and 27 would be substantially identical, so that it then is necessary only to produce fields of equal magnitudes in the two elements to make the algebraic sum of the retardation effects therein substantially zero. This may be done by connecting the two identical elements in series, as shown in Figs. 1 and 2, although the parallel connection may be used if the amplifier 38 is designed to be coupled to a low impedance load.

The optical rotation plate 28 is disposed along the optical path between the elements 26 and 27 for providing therebetween an effective 90° rotation of the plane of any plane-polarized light component passing therethrough along the optical path. A Z-cut quartz plate may be incorporated in the control unit to provide the desired optical rotation. An advantage of quartz for this purpose is its comparatively high stiffness, while the appreciable dispersion of its optical activity, particularly in the blue part of the visible spectrum, due to resonance in the far ultra-violet, would constitute a drawback unless applied to substantially monochromatic light. Rotation plates of sodium chlorate may be provided alternatively. This material is less stiff than quartz, but its rotatory power is substantially free from dispersion in the visible spectrum; also, it is comparatively easy to obtain large single crystals by growth from aqueous solution.

It is noted that the optical rotation is imparted to any plane-polarized light component passing along the optical path, regardless of the orientation of the plane of polarization. It was mentioned hereinabove that an effective 90° rotation of the plane of polarization may be obtained with a half wave retardation plate. However, this rotation is obtained only when the plane of polarization of the entrant light is intermediate the planes of the slow and fast rays through the retardation plate. Hence such a retardation plate cannot be used for the optical rotation arrangement in the device of the present invention.

Nevertheless, it is possible to obtain a true optical rotation with certain tandem combinations of optical retardation plates. Split mica sheets may be used in building up such composite rotators, thus eliminating the grinding operations resorted to in preparing rotator plates of the type mentioned herein above.

A rotation arrangement which is a composite of a plurality of retardation plates contains in its simplest form two half wave retardation plates in tandem with the principal retardation directions rotated by 45° with respect to each other. A somewhat simplified explanation of the operation of this composite rotator may be helpful. If polarized light has the polarization vector parallel to either of the two mutually perpendicular principal directions of one plate, the light is unaffected by this plate but is rotated by 90° in passage through the other plate. Thus, it is clear that there are eight directions of the polarization vector, every 45°, in which the composite plate acts as a 90° rotator. However, it follows from the fact that the rank of the tensors describing optical phenomena is only two that such an octagonal symmetry is equivalent to isotropy. Indeed, formal analysis confirms that such a composite rotator plate acts as a true 90° rotator for any direction of polarization perpendicular to the ray axis.

Composite optical rotation plates also may be made containing more than two retardation plates. For a more complete understanding of the principles applicable to such composite rotators, in accordance with which those skilled in the art will be enabled to design rotation arrangements suitable for incorporation in the device of the present invention, reference is made to the paper by Francis Perrin in the Journal of Chemical Physics, vol. 10, pages 415–427 (July 1942). Further reference is made in this connection to a series of papers by R. C. Jones in the Journal of the Optical Society of America; see vol. 31, pages 488–503 (June 1941); vol. 32, pages 486–493 (August 1942); vol. 37, pages 107–112 (February 1947); and vol. 38, pages 671–685 (August 1948). It is noted further that retardation plates of stretched plastic sheets may be used in these composite rotation plates.

Following the control unit 17 along the optical path is the analyzer 18, illustrated schematicaly in Fig. 2. The analyzer is oriented to pass substantially only the components of the light reaching it which are polarized in a vertical plane. It will be understood that changing the analyzer to pass horizontaly polarized light merely would reverse the polarity of the control effect. It may be noted further that, in the absence of the retardation plate 16, the rotator 28 would cause all the light passing the polarizer 14, and not attenuated by unavoidable absorption and reflection, to pass the analyzer 18 when no signal is applied to the control unit 17. In other words, in the absence of the retardation plate 16, the shutter arrangement illustrated would be normally open instead of normally closed, as would be the case with a horizontally oriented analyzer.

In dealing with single crstalline materials it is conventional to adopt a frame of reference related to the crystallographic axes of the material. This has been done, as mentioned hereinabove, in designating the X-, Y-, and Z-axes of each of the P-type controllable retardation elements illustrated in Fig. 2. Since the directions of the axes in the XY-planes of the two elements 26 and 27 are turned 90° relative to each other, a corresponding rotation in the crystallographic frame of reference conventionally would be introduced between the two elements. With reference to their respective coordinate systems the retardation effects of these two similar elements on polarized light propagating in the Z-direction would be the same; this implies, of course, that the effects are imparted to light having a predetermined plane of polarization relative to the coordinate system for the respective element. If, however, a common frame of reference, external to the physical components of the device, is chosen for the two elements and the entrant light has a predetermined plane of polarization relative to this external frame of reference, it will be clear that the two elements introduce retardation effects of opposite sign, the sum of which is substantially zero. Nevertheless, the rotation plate 28 effectively rotates the frame of reference by 90° for light passing axially through the control unit 17, with the result that the retardation developed in the plate 27 has the same sign as the retardation developed in the plate 26. Because the signal voltages across the two similar elements 26 and 27 are the same, half of the total retardation occurs in the element 26 and the other half in the other element 27. Removal of the rotator 28, of course, would result in no net retardation.

To illustrate the operation of the arrangement of Figs. 1 and 2, let it be assumed that a signal voltage is applied from the amplifier 38 to the signal terminals of the control unit 17 with the polarity indicated in Fig. 2. In such a case the orientations of the fast and slow polarized rays through the elements 26 and 27 may be as indicated in Fig. 2, and the retardation introduced by element 26 has the same sign as the retardation due to the fixed retardation plate 16. Furthermore, although the orientations of the fast and slow rays are interchanged in the element 27 with respect to a common external frame of reference, the interposition of the rotation arrangement 28 causes the element 27 to introduce an additional retardation of the same sign as that effected by the preceding elements. If it be assumed further that the amplitude of the electrical signal is sufficient to effect a total retardation of a quarter wavelength in the elements 26 and 27, these elements together with the quarter-wave retardation plate 16 will cause an effective 90° rotation of the plane of polarization. Adding to this the 90° rotation caused by the rotator 28, the light reaching the analyzer 18 is again horizontally polarized and will not pass the analyzer.

If the same signal amplitude is applied but with reversed polarity, the retardation due to the elements 26 and 27 would cancel exactly the fixed retardation introduced by the plate 16. In this case the rotator 28 would cause a net rotation of 90°, so that all the light leaving the polarizer 14 and not lost by virtue of the imperfect transparency of the intervening elements would pass through the analyzer 18 and be focused by the lens 19 on the film 21.

Ordinarily alternating electrical signals would be applied to the control unit 17 at considerably smaller voltages than those required to close and open the shutter as in the examples just given. In the Fig. 1 arrangement, the controlling signals ordinarily applied to the control unit 17 by the amplifier 38 cause relatively small retardation effects in the elements 26 and 27, resulting in substantially linear variations in the light passing the analyzer. Accordingly a faithful record of the input signals, which may cover a very broad band of signal frequencies is obtained on the moving film 21.

The optical effects discussed herein are in terms of wave-length. Therefore, the device works ideally for monochromatic light only. However, in practical applications appreciable wavelength bands may be used in many cases. If a material used in the optical path has appreciable dispersion—that is, wave-length dependence —of the refractive index, the permissible color band is, of course, narrower. Since the shutter action is different for light of different wavelength, it is possible to utilize the device of the present invention in selecting a desired color or colors.

In general the material of the two crystalline elements 26 and 27, which has substantially the same property of responding to a varying homogeneous electrostatic field therein by exhibiting a substantial optical retardation proportional to the electrostatic field, also has the property of responding to the same varying electrostatic field by developing substantial piezoelectric stresses. In electromechanical transducer devices such piezoelectric responses are put to use, but in the electro-optical devices of the present invention the piezoelectric stresses, if allowed to produce corresponding strains, would introduce unwanted and undesirable optical effects such as those mentioned hereinabove in connection with the indirect electro-optic effect.

The principal purpose of the arrangement of the present invention is the elimination of the effects isomorphic with, but different from, the linear clamped electro-optic effect, which is made additive. It may be noted that this purpose is indeed achived, since the effects developed in the first element 26 are cancelled by corresponding effects of opposite sign or sense developed in the second element 27; the one execption to this is the direct electro-optic effect, namely the retardation experienced by plane-polarized light propagating in the axial direction along the optical path, since this light experiences the desired retardation in plate 27 as well as in plate 26 due to the rotator 28. As to the effects associated with elastic strains, it is important that the two elements 26 and 27 be firmly cemented together with the rotator 28 interposed therebetween. This is to provide for an effective cancellation of the piezoelectric strains developed in the one element by the strains developed in the other.

Thus, when a plurality of controllable retardation elements are incorporated in the device, the piezoelectric stresses developed in the elements are of opposite senses in successive ones of the elements. In the Fig. 1 arrangement, for example, an electrical signal of predetermined polarity applied to the two elements causes expansion in one direction intermediate the X- and X-axes and contraction in the other diagonal direction. Furthermore, while the element 26 tends to expand along one diagonal and contract along the other diagonal, the element 27 tends simultaneously to contract along the one diagonal and expand along the other. When both of the elements are firmly cemented to the plate 28, however, there can be no net expansion or contraction along either diagonal, and the indirect electro-optic effect is largely suppressed in these elements. In this way, frequency band limitations which might arise due to dimensional resonances in a single retardation element are substantially avoided.

In the Fig. 1 arrangement the stresses developed piezoelectrically in the two elements 26 and 27 do cause strains of a flexural, specifically saddle-shaped, nature, although there is no net expansion or contraction in the control unit 17. These residual strains may be eliminated in a device such as that illustrated by Fig. 3. In Fig. 3 there is shown an alternative form of control unit 17'. This control unit comprises three crystalline elements 41, 42, and 43, disposed with predetermined crystallographic orientations along the optical path of an apparatus such as that illustrated in Fig. 1 for passage of the polarized light through the three elements successively.

Choice of materials and dimensions for these electro-optic elements is dictated by considerations similar to those met with in designing the device of Figs. 1 and 2. Thus, the three elements in the unit 17' may be identical Z-cut plates cut from a P-type crystal material. The elements 41 and 43 may be oriented with their X- and Y-axes, respectively, parallel to each other—for example, with the same orientation as that of the element 26 in the control unit 17—while the central element 42 may be oriented with a 90° rotation about the Z-axis, as is the element 27 in the arrangement of Figs. 1 and 2. Two optical rotation plates 44 and 46 are disposed individually along the optical path between the successive ones of these three elements and firmly cemented on both sides of each of the plates 44 and 46 to the respective adjacent ones of the three elements. The three elements 41, 42, and 43 are provided individually with pairs of electrodes, which, however, are too thin to be distinguishable separately in the drawing. The plates 44 and 46 provide individually between the adjacent ones of the elements 41, 42, and 42, 43 90° rotations of the plane of polarized light passing along the optical path.

To illustrate the electrode and terminal circuit means in the Fig. 3 arrangement, the amplifier 38 is shown with its input circuit coupled to the signal source 37. The output circuit is coupled to the six electrode terminals of the three elements 41–43 for applying electrical energy individually thereto. The terminal circuit means in this embodiment is arranged for interconnection to produce electrostatic fields in the elements of such relative polarities and magnitudes that, with respect to a common frame of reference, the retardation effect developed in the central one 42 of the three elements is of opposite sign from, and of twice the magnitude of, the retardation effect developed in each of the other two, 41 and 43, of the elements. Thus, the polarity of the electric field in each element will be seen to be the same at any instant as viewed from left to right in the drawing, but the two outer elements 41 and 43 are connected in series so that the voltage across each of these two elements is only half the voltage across the central element 42.

Since the orientation of the central element is rotated 90° with respect to the orientation of the outer elements, while the polarity of the electrical signal applied to each is the same, it follows that, with respect to a common external frame of reference, the retardation effects developed in any two successive ones of the elements are of opposite sign. It may be noted also that for a given voltage across an individual element the retardation developed has the same magnitude regardless of the thickness of the element, since the retardation is proportional not only to thickness but also to potential gradient. Consequently, the retardation in each of the elements 41 and 43 is half that in the element 42, and the algebraic sum of the retardation effects is substantially zero with respect to the common frame of reference. However, the presence of the 90° rotators 44 and 46 effectively changes the frame of reference for the polarized light from element to element, so that the retardation effects become additive.

With the control unit 17' of Fig. 3, the piezoelectric stress developed in the central element 42 is of the opposite sense from the piezoelectric stresses developed in each of the other elements 41 and 43 and of twice the magnitude. Because the stress pattern is symmetrical with respect to a central plane of the central element, there is nullification not only of the average extensional and contractional stresses, but also of their resultant moments; this results in substantial elimination of all strains in the composite structure by virtue of the second order cancellation of induced stresses. In this way, the residual strains to which the Fig. 1 arrangement is subject are substantially eliminated.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A device for controlling the intensity of plane-polarized light directed along an optical path, comprising: a plurality of elements, cut from single-crystalline material belonging to one of the crystal classes characterized by a four-fold inversion-rotation axis and by planes of symmetry containing said axis, disposed along said optical path for passage of said polarized light therethrough successively, with an inversion-rotation axis of each such element aligned in the direction of said optical path and with predetermined orientations of the other crystallographic axes thereof; a plurality of electrode and terminal circuit means for applying electrical potentials individually across each of said plurality of elements to produce an electrostatic field in the direction of said last mentioned inversion-rotation axis thereof with the development therein of a corresponding optical retardation effect on said polarized light; and at least one optical rotation arrangement, disposed along said optical path between successive ones of said plurality of elements, for providing therebetween an effective ninety degree rotation around the direction of said optical path of a plane-polarized light component having any angular position of its plane of polarization upon entering said rotation arrangement; all of said terminal circuit means being arranged for interconnection to produce in said elements said electrostatic fields of such relative polarities and magnitudes that, with respect to an external frame of reference, said retardation effects developed in those two of said elements preceding and following each said optical rotation arrangement would be of opposite sign and also that the algebraic sum of said retardation effects developed in all said elements would be substantially zero, whereas, due to said intervening ninety degree rotation developed in each said rotation arrangement, said retardation effects are additive.

2. A device for controlling the intensity of plane-polarized light directed along an optical path, comprising: a plurality of P-type crystal elements, disposed along said optical path for passage of said polarized light therethrough successively, with the crystallographic Z-axis of each such element aligned in the direction of said optical path and with predetermined orientations of the X- and Y-axes thereof; a plurality of electrode and terminal circuit means for applying electrical potentials individually across each of said plurality of elements to produce an electrostatic field in the direction of said Z-axis thereof with the development therein of a corresponding optical retardation effect on said polarized light; and at least one optical rotation arrangement, disposed along said optical path between successive ones of said plurality of elements, for providing therebetween an effective ninety degree rotation around the direction of said optical path of a plane-polarized light component having any angular position of its plane of polarization upon entering said rotation arrangement; all of said terminal circuit means being arranged for interconnection to produce in said elements said electrostatic fields of such relative polarities and magnitudes that, with respect to an external frame of reference, said retardation effects developed in those two of said elements preceding and following each said optical rotation arrangement would be of opposite sign and also that the algebraic sum of said retardation effects developed in all said elements would be substantially zero, whereas, due to said intervening ninety degree rotation developed in each said rotation arrangement, said retardation effects are additive.

3. A device for controlling the intensity of plane-polarized light directed along an optical path, comprising: a plurality of elements of ammonium dihydrogen phosphate crystal material, disposed along said optical path for passage of said polarized light therethrough successively, with the crystallographic Z-axis of each such element aligned in the direction of said optical path and with predetermined orientations of the X- and Y-axes thereof; a plurality of electrode and terminal circuit means for applying electrical potentials individually across each of said plurality of elements to produce an electrostatic field in the direction of said Z-axis thereof with the development therein of a corresponding optical retardation effect on said polarized light; and at least one optical rotation arrangement, disposed along said optical path between successive ones of said plurality of elements for providing therebetween an effective ninety degree rotation around the direction of said optical path of a plane-polarized light component having any angular position of its plane of polarization upon entering said rotation arrangement; all of said terminal circuit means being arranged for interconnection to produce in said elements said electrostatic fields of such relative polarities and magnitudes that, with respect to an external frame of reference, said retardation effects developed in those two of said elements preceding and following each said optical rotation arrangement would be of opposite sign and also that the algebraic sum of said retardation effects developed in all said elements would be substantially zero, whereas, due to said intervening ninety degree rotation developed in each said rotation arrangement, said retardation effects are additive.

4. A device for controlling the intensity of plane-polarized light directed along an optical path, comprising: a plurality of elements of potassium dihydrogen phosphate crystal material, disposed along said optical path for passage of said polarized light therethrough successively, with the crystallographic Z-axis of each such element aligned in the direction of said optical path and with predetermined orientations of the X- and Y-axes thereof; a plurality of electrode and terminal circuit means for applying electrical potentials individually across each of said plurality of elements to produce an electrostatic field in the direction of said Z-axis thereof with the development therein of a corresponding optical retardation effect on said polarized light; and at least one optical rotation arrangement, disposed along said optical path between successive ones of said plurality of elements, for providing therebetween an effective ninety degree rotation around the direction of said optical path of a plane-polarized light component having any angular position of its plane of polarization upon entering said rotation arrangement; all of said terminal circuit means being arranged for interconnection to produce in said elements said electrostatic fields of such relative polarities and magnitudes that, with respect to an external frame of reference, said retardation effects developed in those two of said elements preceding and following each said optical rotation arrangement would be of opposite sign and also that the algebraic sum of said retardation effects developed in all said elements would be substantially zero, whereas, due to said intervening ninety degree rotation developed in each said rotation arrangement, said retardation effects are additive.

5. A device for controlling the intensity of plane-polarized light directed along an optical path, comprising: a plurality of elements of potassium dihydrogen arsenate crystal material, disposed along said optical path for passage of said polarized light therethrough successively, with the crystallographic Z-axis of each such element aligned in the direction of said optical path and with predetermined orientations of the X- and Y-axes thereof; a plurality of electrode and terminal circuit means for applying electrical potentials individually across each of said plurality of elements to produce an electrostatic field in the direction of said Z-axis thereof with the development therein of a corresponding optical retardation effect on said polarized light; and at least one optical rotation arrangement, disposed along said optical path between successive ones of said plurality of elements, for providing therebetween an effective ninety degree rotation around the direction of said optical path of a plane-polarized light component having any angular position of its plane of polarization upon entering said rotation arrangement; all of said terminal circuit means being arranged for interconnection to produce in said elements said electrostatic fields of such relative polarities and magnitudes that, with respect to an external frame of reference, said retardation effects developed in those two of said elements preceding and following each said optical rotation arrangement would be of opposite sign and also that the algebraic sum of said retardation effects developed in all said elements would be substantially zero, whereas, due to said intervening ninety degree rotation developed in each said rotation arrangement, said retardation effects are additive.

6. A device for controlling the intensity of plane-polarized light directed along an optical path, comprising: a plurality of Z-cut elements of P-type crystal material, disposed along said optical path for passage of said polarized light therethrough successively, with the crystallographic Z-axis of each such element aligned in the direction of said optical path and with predetermined orientations of the X- and Y-axes thereof; a pair of electrodes in said light path adjacent to the Z-faces of each of said elements and at least partially transparent to said light to permit said light to enter and leave each of said elements; terminal circuit means for applying electrical potentials individually across each of said pairs of electrodes to produce an electrostatic field in the direction of said Z-axis of each of said elements with the development therein of a corresponding optical retardation effect on said polarized light; and at least one optical rotation arrangement, disposed along said optical path between successive ones of said plurality of elements, for providing therebetween an effective ninety degree rotation around the direction of said optical path of a plane-polarized light component having any angular position of its plane of polarization upon entering said rotation arrangement; said terminal circuit means being arranged for interconnection to produce in said elements said electrostatic fields of such relative polarities and magnitudes that, with respect to an external frame of reference, said retardation effects developed in those two of said elements preceding and following each said optical rotation arrangement would be of opposite sign and also that the algebraic sum of said retardation effects developed in all said elements would be substantially zero, whereas, due to said intervening ninety degree rotation developed in each said rotation arrangement, said retardation effects are additive.

7. A device for controlling the intensity of plane-polarized light directed along an optical path, comprising: a plurality of crystalline elements, disposed with predetermined crystallographic orientations along said optical path for passage of said polarized light through said elements successively, each of which is of crystalline material having substantially the same property, when rigidly constrained elastically, of responding to variable homogeneous electric fields in predetermined directions therewithin by imposing on such polarized light optical retardations proportional to said electric fields; a plurality of electrode and terminal circuit means for applying electric potentials individually across each of said plurality of elements to produce electric fields in said predetermined directions therewithin; and at least one optical rotation arrangement, disposed along said optical path between successive ones of said plurality of elements, for providing therebetween an effective ninety degree rotation around the direction of said optical path of a plane-polarized light component having any angular position of its plane of polarization upon entering said rotation arrangement; all of said terminal circuit means being arranged for interconnection to produce in said elements said electric fields of such relative polarities and magnitudes that, with respect to an external frame of reference, said retardation effects developed in those two of said elements preceding and following each said rotation arrangement would be of opposite sign and also that the algebraic sum of said retardation effects developed in all said elements would be substantially zero, whereas, due to said intervening ninety degree rotation developed in each said rotation arrangement, said retardation effects are additive.

8. A device for controlling the intensity of plane-polarized light directed along an optical path, comprising: two crystalline elements, disposed with predetermined crystallographic orientations along said optical path for passage of said polarized light through said elements successively, each of which is of crystalline material having substantially the same property, when rigidly constrained elastically, of responding to variable homogeneous electric fields in predetermined directions therewithin by imposing on such polarized light optical retardations proportional to said electric fields; electrode and terminal circuit means for applying electric potentials individually across said elements to produce electric fields in said predetermined directions therewithin; and an optical rotation arrangement, disposed along said optical path between said elements, for providing therebetween an effective ninety degree rotation around the direction of said optical path of a plane-polarized light component having any angular postion of its plane of polarization upon entering said rotation arrangement; said terminal circuit means being arranged for interconnection to produce in said two elements said electric fields of such relative polarities and magnitudes that, with respect to an external frame of reference, said retardation effects developed in said two elements would be of opposite sign and also that the algebraic sum of said retardation effects would be substantially zero, whereas said retardation effects are additive due to said intervening ninety degree rotation.

9. A device for controlling the intensity of plane-polarized light directed along an optical path, comprising: two substantially identical crystalline elements provided individually with electrodes, disposed with predetermined crystallographic orientations along said optical path for passage of said polarized light through said elements successively, and of crystalline material having the property, when rigidly constrained elastically, of responding to variable homogeneous electric fields in directions therewithin between said respective electrodes by imposing on such polarized light optical retardations proportional to said electric fields; terminal circuit means for applying electric potentials individually across said electroded elements to produce electric fields in said directions therewithin; and an optical rotation arrangement, disposed along said optical path between said elements, for providing therebetween an effective ninety degree rotation around the direction of said optical path of a plane-polarized light component having any angular position of its plane of polarization upon entering said rotation arrangement; said terminal circuit means being arranged for interconnection to produce in said two elements said electric fields of equal magnitudes and of such relative polarities that, with respect to an external frame of reference, said retardation effects developed in said two elements would be of opposite sign but are additive due to said intervening ninety degree rotation.

10. A device for controlling the intensity of plane-polarized light directed along an optical path, comprising: a plurality of crystalline elements, disposed with predetermined crystallographic orientations along said optical path for passage of said polarized light through said elements successively, each of which is of crystalline material having substantially the same property, when rigidly constrained elastically, of responding to variable homogeneous electric fields in predetermined directions therewithin by imposing on such polarized light optical retardations proportional to said electric fields; a plurality of electrode and terminal circuit means for applying electric potentials individual across each of said plurality of elements to produce electric fields in said predetermined directions therewithin; and an optical rotation plate disposed along said optical path between each successive ones of said plurality of elements for providing therebetween a ninety degree rotation around the direction of said optical path of a plane-polarized light component having any angular postion of its plane of polarization upon entering said respective rotation plate; all of said terminal circuit means being arranged for interconnection to produce in said elements said electric fields of such relative polarities and magnitudes that, with respect to an external frame of reference, said retardation effects developed in any two successive ones of said elements would be of opposite sign and also that the algebraic sum of said retardation effects developed in all said elements would be substantially zero, whereas, due to said intervening ninety degree rotation developed in each said rotation plate, said retardation effects are additive.

11. A device for controlling the intensity of plane-polarized light directed along an optical path, comprising: a plurality of crystalline elements, disposed with predetermined crystallographic orientations along said optical path for passage of said polarized light through said elements successively, each of which is of crystalline material having substantially the same property, when rigidly constrained elastically, of responding to variable homogeneous electric fields in predetermined directions therewithin by imposing on such polarize light optical retardations proportional to said electric fields; a plurality of electrode and terminal circuit means for applying electric potentials individually across each of said plurality of elements to produce electric fields in said predetermined directions therewithin; and an optical rotation plate, disposed along said optical path between each successive ones of said plurality of elements and firmly cemented on both sides of said plate to the respective adjacent ones of said elements, for providing therebetween a ninety degree rotation around the direction of said optical path of a plane-polarized light component having any angular position of its plane of polarization upon entering said respective rotation plate; all of said terminal circuit means being arranged for interconnection to produce in said elements said electric fields of such relative polarities and magnitudes that, with respect to an external frame of reference, said retardation effects developed in any two successive ones of said elements would be of opposite sign and also that the algebraic sum of said retardation effects developed in all said elements would be substantially zero, whereas, due to said intervening ninety degree rotation developed in each said rotation plate, said retardation effects are additive.

12. A device for controlling the intensity of plane-polarized light directed along an optical path, comprising: a plurality of crystalline elements, disposed with predetermined crystallographic orientations along said optical path for passage of said polarized light through said elements successively, each of which is of crystalline material having substantially the same property of responding to varying homogeneous electric fields in predetermined directions therewithin by developing substantial piezoelectric stresses and also by imposing on such polarized light, when said material is rigidly constrained elastically, substantial optical retardations proportional to said electric fields; a plurality of electrode and terminal circuit means for applying electric potentials individually across each of said plurality of elements to produce electric fields in said predetermined directions therewithin; and an optical rotation plate, disposed along said optical path between each successive ones of said plurality of elements and firmly cemented on both sides of each said plate to the respective adjacent ones of said elements, for providing therebetween a ninety degree rotation around the direction of said optical path of a plane-polarized light component having any angular position of its plane of polarization upon entering said respective rotation plate; all of said terminal circuit means being arranged for interconnection to produce in said elements said electric fields of such relative polarities and magnitudes that, with respect to an external frame of reference, said retardation effects developed in any two successive ones of said elements would be of opposite sign and also that the algebraic sum of said retardation effects developed in all said elements would be substantially zero, whereas, due to said intervening ninety degree rotation developed in each said rotation plate, said retardation effects are additive, while said piezoelectric stresses developed in said elements are of opposite senses in successive ones of said elements.

13. A device for controlling the intensity of plane-polarized light directed along an optical path, comprising: three crystalline elements, disposed with predetermined crystallographic orientations along said optical path for passage of said polarized light through said elements successively, each of which is of crystalline material having substantially the same property of responding to varying homogeneous electric fields in predetermined directions therewithin by developing substantial piezoelectric stresses and also by imposing on such polarized light, when said material is rigidly constrained elastically, substantial optical retardations proportional to said electric fields; electrode and terminal circuit means for applying electric potentials individually across said three elements to produce electric fields in said predetermined directions therewithin; and two optical rotation plates, disposed individually along said optical path between the successive ones of said three elements and firmly cemented on both sides of each of said plates to the respective adjacent ones of said three elements, for providing individually between said adjacent ones of said elements ninety degree rotations around the direction of said optical path of a plane-polarized light component having any angular position of its plane of polarization upon entering said respective rotation plate; said terminal circuit means being arranged for interconnection to produce in said elements said electric fields of such relative polarities and magnitudes that said retardation effect developed in the central one of said three elements not only is of twice the magnitude of said retardation effect developed in each of the other two of said elements but also is of a sign which, with respect to an external frame of reference, would be opposite from the sign of said retardation effects developed in said other two elements, whereas, due to said intervening ninety degree rotations developed individually in said two rotation plates, said retardation effects are additive while said piezoelectric stress developed in said central element is of the opposite sense from the sense of said piezoelectric stresses developed in said other two elements with substantial elimination of all strains in said device.

14. A light modulator system including a light source, a polarizer and an analyzer in line with the light source, the polarizer passing light but placing it in a state of polarization such that the analyzer will not accept it, a pair of substantially identical crystals interposed between the polarizer and the analyzer, said crystals having their optical axes positioned parallel to the optical axis of the system and being uni-axial but being capable of being made bi-axial by a change in physical environment, means for variably changing the physical environment of the crystals to change them to varying degrees of bi-axial condition, and means positioned between the crystals to interchange the identity of the ordinary and extra-ordinary waves between the crystals so that both the ordinary and extra-ordinary waves have the same travel characteristics upon completion of their passage through both crystals.

References Cited in the file of this patent

UNITED STATES PATENTS

| | | |
|---|---|---|
| 2,163,530 | Thieme | June 20, 1939 |
| 2,247,051 | Chilowsky et al. | June 24, 1941 |
| 2,463,109 | Jaffe | Mar. 1, 1949 |
| 2,467,325 | Mason | Apr. 12, 1949 |
| 2,493,200 | Land | Jan. 3, 1950 |